US005635697A

United States Patent [19]

Shellhammer et al.

[11] Patent Number: 5,635,697
[45] Date of Patent: *Jun. 3, 1997

[54] METHOD AND APPARATUS FOR DECODING TWO-DIMENSIONAL BAR CODE

[75] Inventors: Stephen J. Shellhammer, Lake Grove; Arman Nikzad, Holbrook; Jerome Swartz, Old Field, all of N.Y.

[73] Assignee: Symbol Technologies, Inc., Bohemia, N.Y.

[*] Notice: The term of this patent shall not extend beyond the expiration date of Pat. No. 5,319,181.

[21] Appl. No.: 253,694

[22] Filed: Jun. 3, 1994

Related U.S. Application Data

[63] Continuation-in-part of Ser. No. 851,493, Mar. 16, 1992, Pat. No. 5,319,181, Ser. No. 126,965, Sep. 27, 1993, Pat. No. 5,399,846, Ser. No. 30,971, Mar. 12, 1993, abandoned, and Ser. No. 41,281, Mar. 30, 1993, abandoned, which is a continuation of Ser. No. 317,533, Mar. 1, 1989, abandoned, said Ser. No. 126,965, is a division of Ser. No. 461,881, Jan. 5, 1990, Pat. No. 5,304,786.

[51] Int. Cl.⁶ .................................................. G06K 7/10
[52] U.S. Cl. ........................... 235/462; 235/470; 235/471
[58] Field of Search ................................. 235/462, 470, 235/471

[56] References Cited

U.S. PATENT DOCUMENTS

| 3,360,659 | 12/1967 | Young | 250/236 |
|---|---|---|---|
| 3,685,723 | 8/1972 | Berler | 235/61.11 |
| 3,699,321 | 10/1972 | Gibson | 235/152 |
| 3,774,014 | 11/1973 | Berler | 235/61.11 |
| 4,000,397 | 12/1976 | Hebert et al. | 235/61.11 |
| 4,096,992 | 6/1978 | Nojiri et al. | 235/462 |
| 4,109,316 | 8/1978 | Snyder | 365/127 |
| 4,113,343 | 9/1978 | Pole et al. | 350/3.71 |
| 4,114,033 | 9/1978 | Okamoto et al. | 235/494 |
| 4,115,703 | 9/1978 | Dobras | 250/568 |
| 4,118,675 | 10/1978 | Rahn et al. | 331/94.5 |
| 4,135,663 | 1/1979 | Nojiri et al. | 235/463 |
| 4,147,295 | 4/1979 | Nojiri et al. | 235/463 |
| 4,158,435 | 6/1979 | Nakanishi et al. | 235/463 |
| 4,160,156 | 7/1979 | Sherer | 235/463 |
| 4,182,956 | 1/1980 | Funk, Jr. et al. | 250/239 |
| 4,210,802 | 7/1980 | Sakai | 235/483 |
| 4,277,127 | 7/1981 | Smith et al. | 350/3.67 |
| 4,305,646 | 12/1981 | Bechtold | 354/5 |
| 4,356,389 | 10/1982 | Quirey et al. | 235/455 |
| 4,409,470 | 10/1983 | Shepard et al. | 235/472 |
| 4,455,485 | 6/1984 | Hosaka et al. | 250/234 |
| 4,528,444 | 7/1985 | Hara et al. | 235/462 |
| 4,560,862 | 12/1985 | Eastman et al. | 235/467 |
| 4,570,057 | 2/1986 | Chadima, Jr. et al. | 235/472 |
| 4,578,568 | 3/1986 | Tsuzuki | 235/436 |
| 4,578,571 | 3/1986 | Williams | 235/472 |
| 4,740,675 | 4/1988 | Brosnan et al. | 235/462 |
| 4,749,879 | 6/1988 | Peterson et al. | 307/354 |

(List continued on next page.)

FOREIGN PATENT DOCUMENTS

| 0 164 012 A1 | 12/1985 | European Pat. Off. . |
| 0 384 955 A2 | 9/1990 | European Pat. Off. . |
| 3903595 A1 | 8/1990 | Germany . |

OTHER PUBLICATIONS

Wang et al., "Postal Applications of a High Density Bar Code" (Sep. 1990).

Wang, "PDF417 Specification" (1991), Symbol Technologies, Inc.

*Primary Examiner*—Andrew M. Dolinar
*Attorney, Agent, or Firm*—Finnegan, Henderson, Farabow, Garrett & Dunner, L.L.P.

[57] ABSTRACT

A method and apparatus for decoding a two-dimensional bar code symbol using a charge-coupled device (CCD) camera, charge-modulation device (CMD) camera, or other bar code reading device such as a hand-held reader, light pen or wand, scan mouse, or stationary laser scanner. The CCD/CMD camera or reading device optically images the bar code symbol to obtain digital image data, which is stored in a memory. The location and orientation of the two-dimensional bar code

12 Claims, 16 Drawing Sheets

U.S. PATENT DOCUMENTS

| | | | |
|---|---|---|---|
| 4,760,248 | 7/1988 | Swartz et al. | 235/472 |
| 4,794,239 | 12/1988 | Allais | 235/462 |
| 4,795,224 | 1/1989 | Goto | 350/6.3 |
| 4,801,788 | 1/1989 | Osaka | 235/462 |
| 4,832,204 | 5/1989 | Handy et al. | 209/3.3 |
| 4,870,367 | 9/1989 | Nakase et al. | 328/168 |
| 4,963,756 | 10/1990 | Quan et al. | 250/568 |
| 4,988,852 | 1/1991 | Krishnan | 235/462 |
| 5,124,537 | 6/1992 | Chandler et al. | 235/462 |
| 5,414,250 | 5/1995 | Swartz et al. | 235/462 |
| 5,414,251 | 5/1995 | Durbin | 235/470 |
| 5,418,357 | 5/1995 | Inoue et al. | 235/462 |

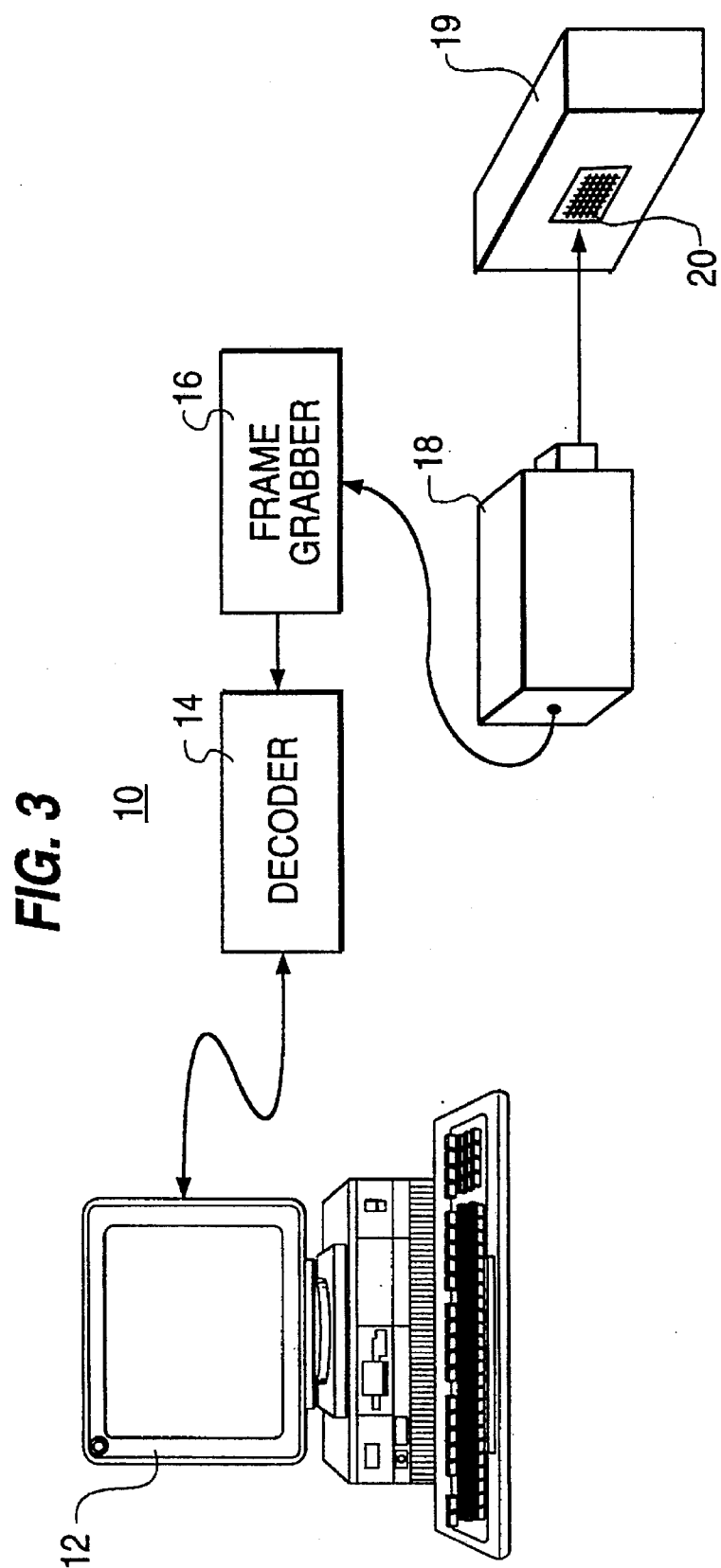

METHOD AND APPARATUS FOR DECODING TWO-DIMENSIONAL BAR CODE

This application is a continuation-in-part of: (1) U.S. patent application Ser. No. 07/851,493, filed Mar. 16, 1992 now U.S. Pat. No. 5,319,181; (2) U.S. patent application Ser. No. 08/126,965, filed Sep. 27, 1993 now U.S. Pat. No. 5,399,846, which is a divisional of U.S. patent application Ser. No. 07/461,881, filed Jan. 5, 1990, now U.S. Pat. No. 5,304,786; (3) U.S. patent application Ser. No. 08/030,971, filed Mar. 12, 1993 now abandoned; and (4) U.S. patent application Ser. No. 08/041,281, filed Mar. 30, 1993 now abandoned, which is a continuation of U.S. patent application Ser. No. 07/317,533, filed Mar. 1, 1989, now abandoned, the contents of which are relied upon and incorporated by reference.

BACKGROUND OF THE INVENTION

The present invention generally relates to the field of bar code readers, and more particularly to a method and apparatus for scanning and decoding a two-dimensional bar code such as PDF417.

Bar codes have become broadly accepted as a means for automatically identifying objects. A bar code symbol is a pattern of parallel bars and spaces of various widths that represent data elements or characters. The bars represent strings of binary ones and the spaces represent strings of binary zeros. Generally, the bars and spaces can be no smaller than a specified minimum width which is called a "module" or "unit." The bars and spaces are multiples of this module size or minimum width.

The conventional bar code symbol is "one-dimensional" in that the bars and spaces extend only in a single direction. There has been an increasing need, however, for machine-readable symbols that contain more information than conventional bar code symbols. One approach for increasing the information in machine-readable symbols is to reduce the height of the bar codes and stack the bar codes one on top of each other to create a "stacked" or "two-dimensional" bar code. One such two-dimensional bar code is PDF417, which was developed by Symbol Technologies, Inc.

Bar code symbols are typically read by optical techniques, such as scanning laser beams, and the resulting electrical signals are then decoded to recover the data encoded in the symbol. When decoding a two-dimensional bar code symbol, however, laser scanners have the disadvantage that the scan lines must be substantially aligned with the rows of the symbol. Although a two-dimensional bar code such as PDF417 allows some deviation, the orientation of the scan lines must still be less than a maximum angle relative to the rows of the symbol.

There are many applications, however, in which it is desirable to be able to read and decode a two-dimensional bar code symbol in any orientation without having to align the reader with rows of the symbol. For example, in an industrial environment, the symbol may be located on an object moving along a conveyor belt where the reader views the symbol from above. Thus, the symbol may be in any orientation relative to the reader.

In addition, it is often desirable to be able to read a code symbol that has defects. For example, handling may cause a corner of a symbol to be torn off, or a stain or scratch may obscure part of a symbol.

SUMMARY OF THE INVENTION

Accordingly, it is a goal of this invention to provide a method and apparatus for reading and decoding a two-dimensional bar code symbol in any orientation.

Another goal is to provide a method and apparatus for reading and decoding a two-dimensional bar code symbol even though the symbol has various defects, such as a damaged corner, a scratch, or a stain, which partially obscure the symbol.

These and other goals may be achieved by optically imaging the two-dimensional bar code symbol, converting the image to lines of image data corresponding to a field of view including the bar code symbol, and storing the image data in a memory. The image data may be obtained by such means as a two-dimensional imaging camera, a hand-held bar code reader that is passed. Over the symbol, a stationary bar code reader in which the symbol is passed by a reading head, or a stationary laser scanner having a linear scanning pattern which the symbol is passed through to obtain successive lines of image data corresponding to the field of view including the bar code symbol. Since the image data remains unchanged in the memory, it can be accessed repetitively to extract different spatial information.

Once the image data is stored in the memory, the location and orientation of the bar code symbol are located within the image data. In particular, the four corners of the symbol are located and then checked to see that they form a rectangle. The image data is then converted to the same format as data obtained from a laser scanner by performing "virtual scanning" of the image data across the rows of the symbol. This data can then be decoded in the same manner as data obtained from a laser scanner.

More specifically, a method for decoding a two-dimensional bar code symbol having rows of bar coded information in which data is represented in each row by a plurality of codewords, each row including a predetermined control codeword which is the same for each row, the codewords being formed of a plurality of modules, comprises the steps of: optically imaging the two-dimensional bar code symbol to obtain lines of image data corresponding to a field of view including the bar code symbol; storing the lines of image data in a memory; determining an orientation of the two-dimensional bar code symbol in the field of view by locating control codewords in at least two positions in the image data; determining a sequence of lines passing through the rows of the bar code symbol in the image data from the orientation derived from the positions of the control codewords; and scanning the two-dimensional bar code symbol in the image data along the sequence of lines to read the codewords. The step of optically imaging the two-dimensional bar code symbol can be accomplished by using a two-dimensional imaging camera to take a picture of the bar code symbol. Other ways to obtain the image data include passing a hand-held bar code reader over the symbol, passing the bar code symbol through a stationary bar code reader in which the symbol is passed by a reading head, or using a stationary laser scanner having a linear scanning pattern which the symbol is passed through. Each of these techniques may be used to obtain successive lines of image data corresponding to the field of view including the bar code symbol, which is in then stored in the memory.

In addition, an apparatus for decoding a two-dimensional bar code symbol having rows of bar-coded information in which data is represented in each row by a plurality of codewords, each row including a predetermined control codeword which is the same for each row, the codewords being formed of a plurality of modules, comprises: a two-dimensional imaging camera or another type of hand-held or stationary bar code reader for optically imaging the bar code symbol to obtain lines of image data corresponding to a field of view including the bar code symbol; a memory for storing the lines of image data; means for determining an orientation of the two-dimensional bar code symbol in the image data by locating at least one of the start and stop codewords; means for determining a sequence of lines passing through the rows of the bar code symbol; and means for scanning the two-dimensional bar code symbol along the sequence of lines to read the codewords.

It is to be understood that both the foregoing general description and the following detailed description are exemplary and explanatory only and are not restrictive of the invention as claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

FIG. 3 is a block diagram illustrating one embodiment of a system for reading a two-dimensional bar code symbol;.

DESCRIPTION OF THE PREFERRED EMBODIMENT

Reference will now be made in detail to the presently preferred embodiment of the invention, an example of which is illustrated in the accompanying drawings.

Code PDF417

Before discussing the preferred method and apparatus for reading and decoding a two-dimensional bar code symbol such as PDF417, it is important to understand the structure of the symbol.

Each PDF417 symbol is composed of a stack of rows of bar-coded information. Each row in the symbol consists of a start pattern, several codewords, and a stop pattern. A codeword is the basic unit for encoding a value representing, or associated with, certain numbers, letters, or other symbols. Collectively, the codewords in each row form data columns.

Both the number of rows and the number of data columns of the PDF417 symbol are variable. The symbol must have at least three rows and may have up to ninety rows. Likewise, within each row, the number of codewords or data columns can vary from three to thirty.

Figure 1:
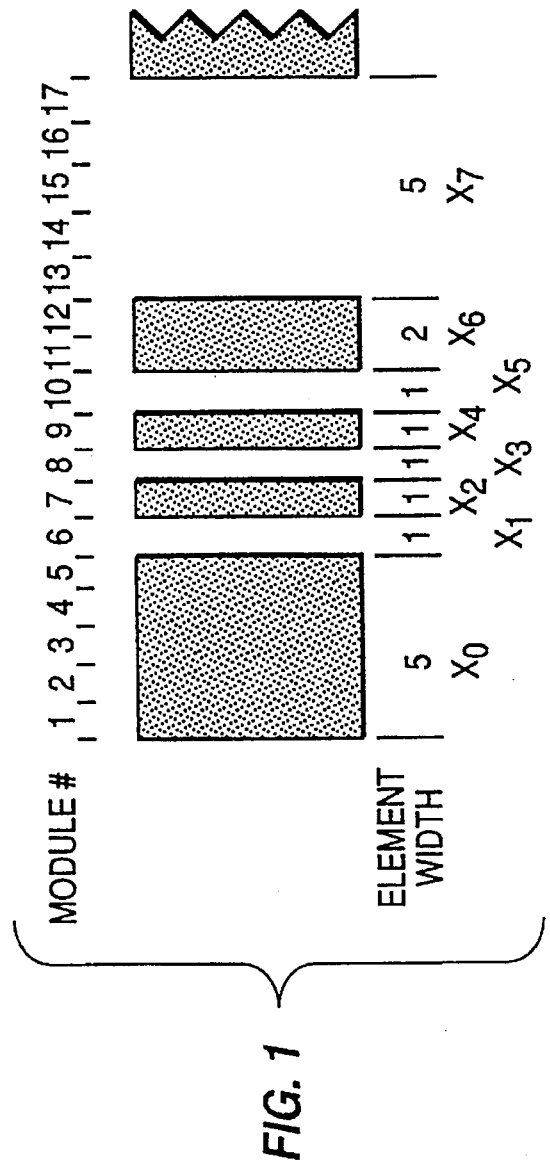
FIG. 1 is a diagram illustrating the modules and sequence of bars and spaces forming a codeword.

Each PDF417 codeword consists of seventeen modules or units. There are four bars and four spaces in each codeword. Individual bars or spaces can vary in width from one to six modules, but the combined total per codeword is always seventeen modules. Thus, each codeword can be defined by an eight-.digit sequence, which represents the four sets of alternating bar and space widths within the codeword. This is called the "X-sequence" of the codeword and may be represented by the sequence $X_0, X_1, \ldots X_7$. For example, for an X-sequence of "51111125", the first element is five modules wide, followed by five elements one module wide, one element two modules wide, and the last element five modules wide. This example is illustrated in FIG. 1.

Figure 2:
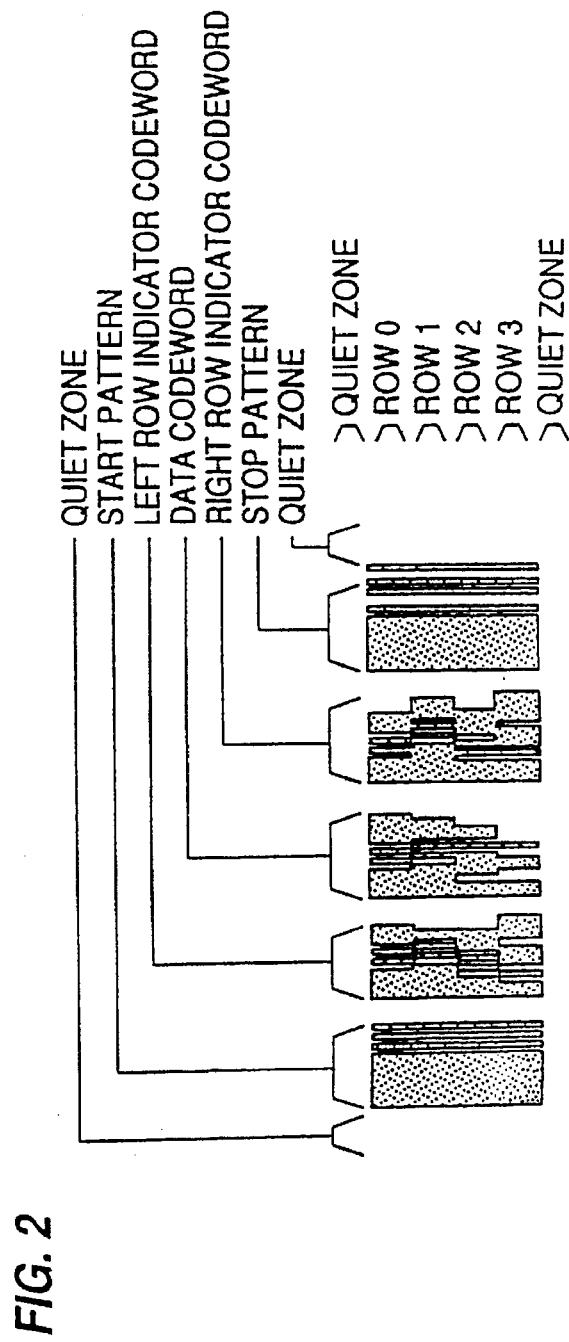
FIG. 2 is a block diagram showing the overall structure of a PDF417 symbol.

FIG. 2 is a block diagram showing the overall structure of a PDF417 symbol. Each row of the symbol consists of a start pattern, a left row indicator codeword, one or more data codewords, a right row indicator codeword, and a stop pattern. The minimum number of codewords in a row is three, including the left row indicator codeword, at least one data codeword, and the right row indicator codeword.

The start and stop patterns identify where each row of the symbol begins and ends. PDF417 uses unique start and stop patterns. The start pattern, or left side of each row, has the unique pattern, or X-sequence, of "81111113". The stop pattern, or right side of each row, has the unique X-sequence of "71131121". Since the start and stop patterns are the same for each row, these patterns form solid structures on the left and right sides of the symbol, respectively. The entire symbol is surrounded by clear spaces or "quiet zones" which contain no dark marks.

Encoding data into a PDF417 symbol is typically a two-step process. First, data is converted into codeword values which represent the data. This is known as "high-level encoding." The values are then physically represented by particular bar-space patterns, which is known as "low-level encoding."

Scanner/Reader System

FIG. 3 illustrates one embodiment of a system for reading a two-dimensional bar code symbol such as PDF417 using a charge-coupled device (CCD) camera or a charge modulation device (CMD) camera. As shown in FIG. 3, a bar code reading system 10 includes a host computer 12, which may be a personal computer, a decoder 14, a frame grabber circuit 16, and a two-dimensional CCD or CMD camera 18. CCD/CMD camera 18 takes a picture of a two-dimensional bar code symbol 20 on an article 19 and converts the image of the bar code symbol to electrical signals. Typically, the output of the CCD/CMD camera is an analog signal in a standard RS-170 format representing the rows of the image being captured along with horizontal and vertical synchronization information.

Alternatively, if the two-dimensional bar code symbol is moving past the camera, the CCD/CMD camera could be only a one-dimensional camera. For example, the bar code symbol may be on an object moving past the camera on a conveyor belt or may be printed on a document that is being scanned by the camera. In this case, the CCD/CMD camera can capture the image of the two-dimensional symbol by scanning successive lines of the symbol as it moves past the camera.

Electrical signals from camera 18 are transmitted to frame grabber circuit 16 which converts the signals into a digital representation of the original image. The analog signals from the CCD/CMD camera are converted to eight-bit gray-level values and transmitted to decoder 14 where they are decoded into a matrix of codeword values corresponding to the rows and columns of the two-dimensional bar code symbol. As explained in further detail below, decoder 14 may be embodied in a computer program operating on a special purpose microprocessor.

The matrix of codeword values from decoder 14 is further decoded into usable data by a high-level decoder, which may be embodied as a separate computer program operating on the host computer 12. For example, PDF417 has three predefined modes and nine reserved modes. The predefined modes are Binary, EXC, and Numeric. In the Binary mode, each codeword can encode 1.2 bytes. In the EXC mode, the alphanumeric data can be encoded in double density (i.e., two characters per code word), and in Numeric mode, the numeric data can be packed in almost triple density. Therefore, the high-level decoder in host computer 12 will further decode the codeword values from low-level decoder 14, depending on the mode, to obtain the actual data embodied in the symbol. This may be done by a data base or look-up table stored in the host computer memory or in another storage medium, such as a magnetic disk, connected to the host computer (not shown). The decoded data from the high-level decoder may then be used by a user application program also operating on the host computer 12.

FIGS. 3A–3E show other examples of various devices that can be used to read or scan the two-dimensional bar code symbol. The image obtained by these devices is converted to a digital representation and stored in the memory of the decoder, where it can be accessed repetitively to determine the location and orientation of the bar code symbol within the image data.

Figure 3A:
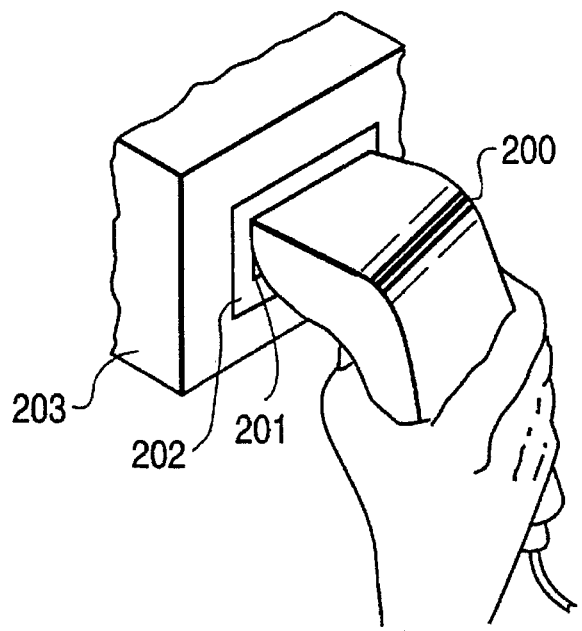
FIG. 3A is a simplified representation of a hand-held bar code reader for reading a two-dimensional bar code symbol.

FIG. 3A shows a simplified perspective representation of an embodiment of one type of hand-held bar code reader, which can be used to read or scan the two-dimensional bar code. The reader may also be implemented in a portable scanner, or as a desk-top workstation or stationary scanner in which the bar code label is swiped across the reading head. In addition, the reader may be implemented as a scan "mouse," in which the reading head is rolled over the two-dimensional bar code symbol. In the embodiment in FIG. 3A, the reader is implemented in a hand-held lightweight plastic housing 200, which is manually positioned by the user to contact the bar code 201 printed on a label 202 attached to an article 203.

Figure 3B:
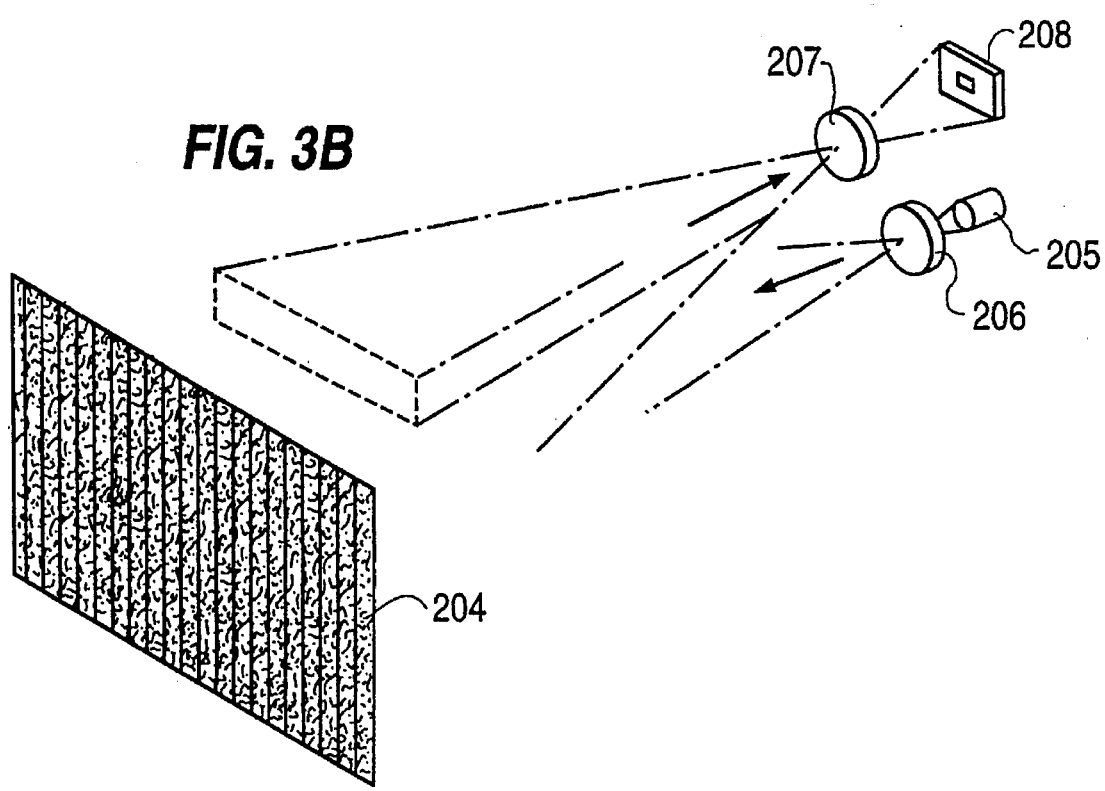
FIG. 3B is a simplified perspective view of the light emitting and receiving components of the bar code reader in FIG. 3A.

FIG. 3B is a simplified perspective view of the light emitting and receiving components of the bar code reader in FIG. 3A. A light source 205, such as a light emitting diode (or an array of light emitting diodes) and a focussing lens 206 (or an array of such lenses) is used to illuminate the field of view with a flood of light, ideally in a narrow rectangular pattern. The reader is positioned over the bar code symbol 204 so that at least an entire row of the symbol 204 is fully illuminated. The reflected or scattered light is returned to the reader through collection optics 207, to a linear CCD array 208. The linear CCD array 208 can read only a single row at a time. Therefore, the reader 200 must be moved manually from the top of the symbol 204 to the bottom so that the entire symbol is scanned.

Figure 3C:
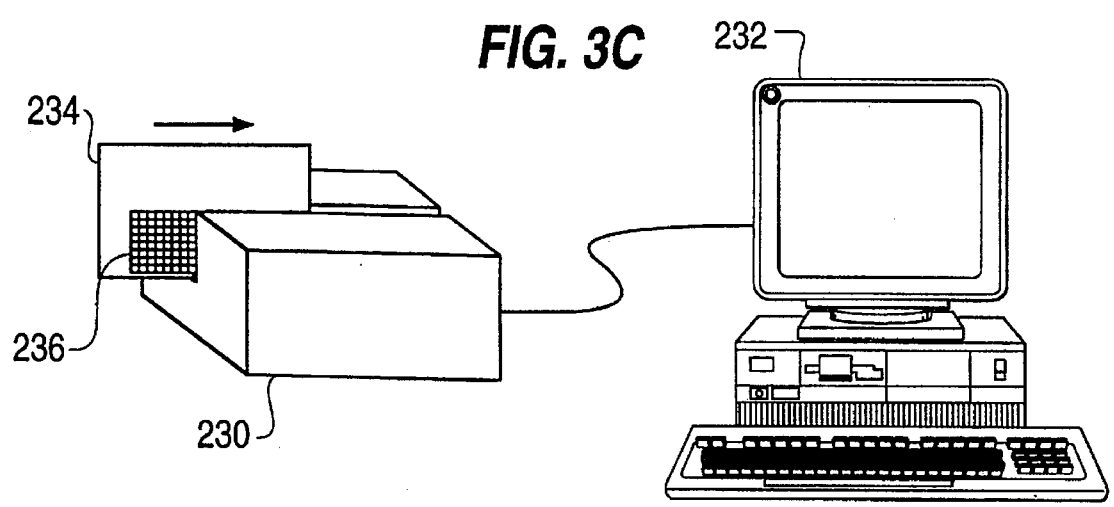
FIG. 3C is a simplified representation of a stationary scanner for reading a two-dimensional bar code symbol.

As noted above, the reader may also be embodied as a desk-top workstation or stationary scanner in which the two dimensional bar code symbol is manually passed by a reading head in the scanner. FIG. 3C is a simplified view of an embodiment of such a stationary scanner 230, which is connected to a host computer 232. A card 234 bearing a two-dimensional bar code symbol 236 is passed through the stationary scanner 230 in the direction indicated. A reading head or linear CCD array captures an image of the symbol 236 by scanning successive lines of the symbol as it moves through the scanner. The image lines are converted to electrical signals, which are then converted into a digital representation of the original image and stored in a memory. The digital values are then decoded, either by the host computer 232 or by a separate special purpose microprocessor in a decoder circuit, which could be located in the stationary scanner 230.

Figure 3D:
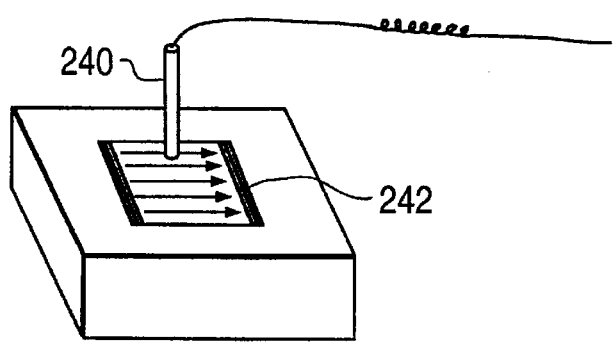
FIG. 3D is a simplified representation of a light pen or wand for reading a two-dimensional bar code symbol.

Another example of a device that can be used to read or scan the two-dimensional bar code symbol is a light pen or wand as shown in FIG. 3D. Specifically, if the two-dimensional bar code symbol is large enough, successive lines of image data could be obtained by manually passing the light pen or wand 240 over the two-dimensional bar code symbol 242 several times.

Figure 3E:
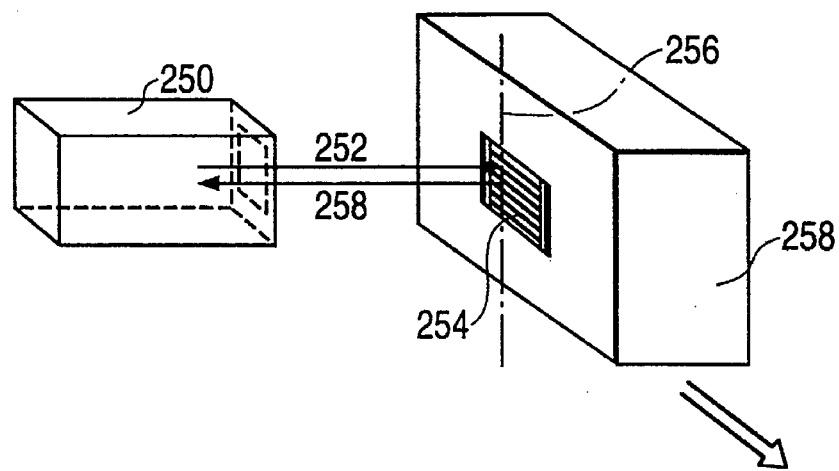
FIG. 3E is a simplified representation of a stationary laser scanner for reading a two-dimensional bar code symbol.

A further example of a device for scanning a two-dimensional bar code is shown as a stationary laser scanner in FIG. 3E. Specifically, an outgoing light beam 252 is generated in the stationary laser scanner 250, usually by a laser diode or the like, and directed to impinge on a two-dimensional bar code symbol 254. The outgoing beam is scanned in a fixed linear pattern, shown as a vertical line 256 in FIG. 3E. Reflected light 258 from the symbol is detected by a light responsive device in the scanner 250, producing serial electrical signals.

As further shown in FIG. 3E, the two-dimensional bar code symbol 254 is placed on an article 258 that is moving past the stationary laser scanner 250 in the direction indicated. Thus, by repeatedly scanning the single line on the symbol as it moves past the scanner, electrical signals corresponding to successive lines of the image are generated. These electrical signals can be converted to digital signals and stored in a memory in the decoder circuitry, where they can be accessed repetitively to determine the location and orientation of the bar code symbol within the image data.

Decoder Apparatus

Figure 4A:
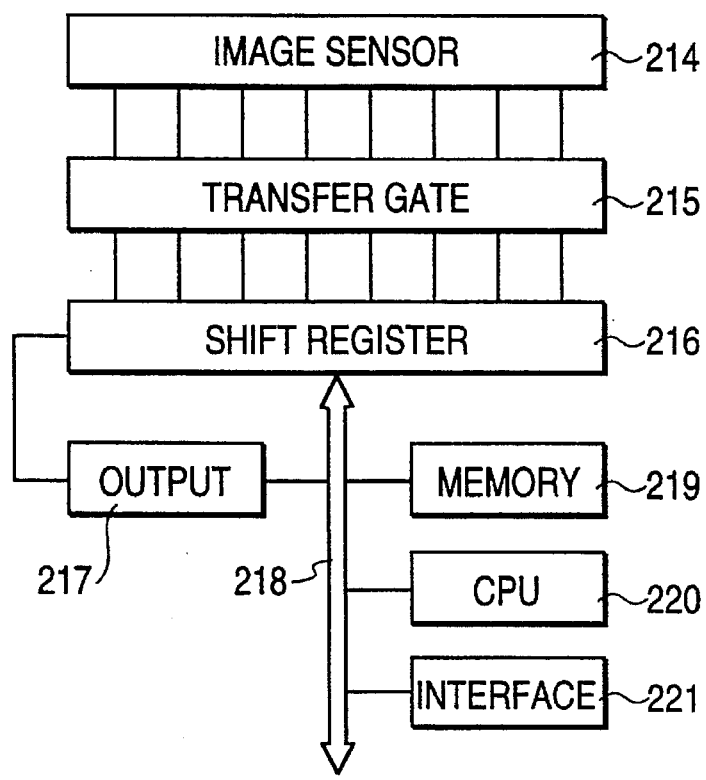
FIG. 4A is a schematic block diagram of another embodiment of the hardware apparatus of the decoder for use with hand-held and stationary readers.
Figure 4:
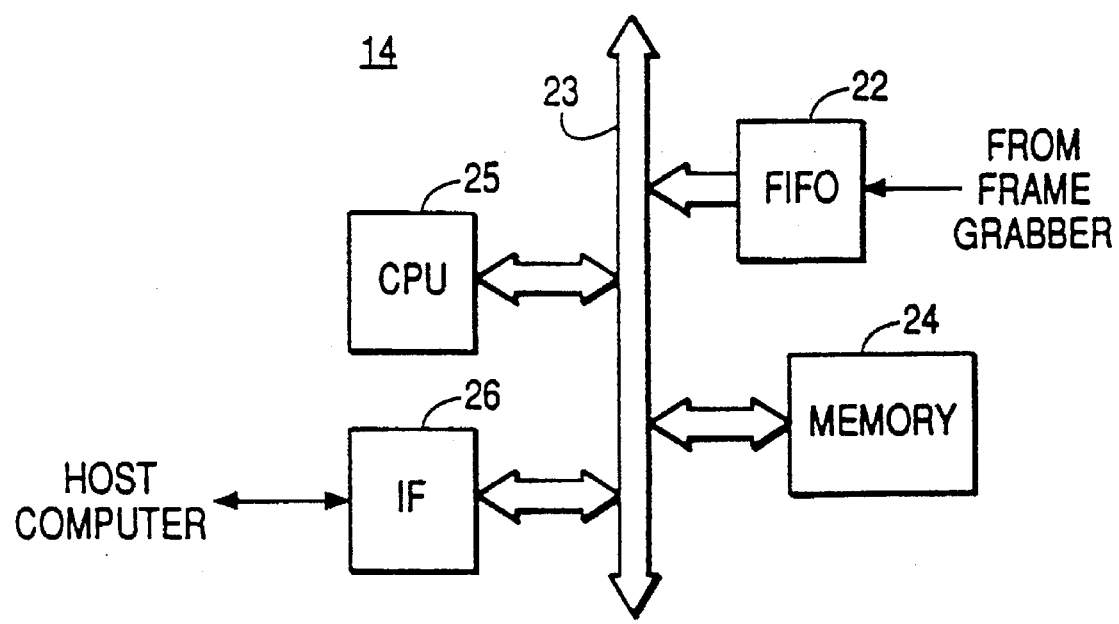
FIG. 4 is a schematic block diagram of one embodiment of the hardware apparatus of a decoder.

FIG. 4 is a schematic block diagram of one embodiment of the hardware apparatus of decoder 14. As shown in FIG. 4, decoder 14 includes a FIFO (first in-first out) memory buffer 22 for receiving the digital data representing the image of the two-dimensional bar code from the frame grabber circuit 16 in FIG. 3. The FIFO buffer 22 temporarily holds the data as it is received from the frame grabber circuit 16 and then stores it in a memory 24. In order to do this, FIFO buffer 22 is connected to a central bus 23 to which the other hardware elements of the low-level decoder are also connected. FIFO buffer 22 has direct memory access (DMA) capability which allows it to store the digital data directly in the memory for decoding. Alternatively, the frame grabber circuit 16 could be connected directly to the bus 23 with DMA capability and thereby store the digital data directly in the memory 24.

The decoder also includes a central processing unit (CPU) 25 and a second interface 26 for communicating with the host computer. The CPU 25 is preferably a high-speed special purpose microprocessor such as the TMS320 digital signal processor. The interface to the host computer may be a standard interface such as an RS-232 interface.

FIG. 4A is a schematic block diagram of another embodiment of the hardware apparatus of the decoder for use with the hand-held and stationary readers shown in FIGS. 3A–3B and FIG. 3C, for example. As shown in FIG. 4A, the image sensor 214, which may be a linear CCD array in either a hand-held bar scanner or a stationary scanner, converts the image representing the row of the bar code symbol into an electrical signal. The image sensor 214 acts as a pickup to obtain the image of the field of view of the scanner. Electrical signals from the image sensor 214 are applied to a transfer gate 215, and in turn to a shift register 216. The shift register has an output circuit 217 which interfaces to a bus 218. The bus 218 is a main data bus for the computer portion of the bar code reader portion, which includes the memory 219, the CPU 220, and the interface 221. The rows of digital data from the output circuit 217 of the shift register 217 are stored directly in the memory 219 for decoding.

DECODER OPERATION

Determining Symbol Location and Orientation

The first task that must be performed by the decoder in decoding a two-dimensional bar code symbol such as PDF417 is to find the location and orientation of the symbol in the image data.

Figure 5:
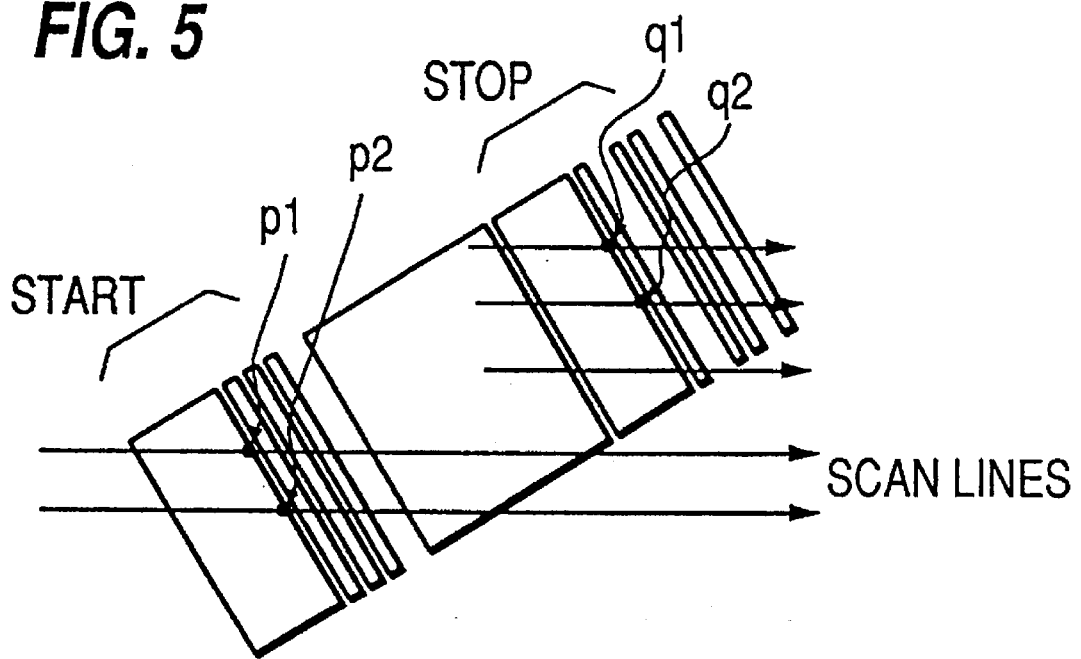
FIG. 5 is a diagram illustrating scanning of data along a given row of an image.

Finding the location and orientation of the symbol is based on finding the start and stop patterns of the symbol in the image data. Operating on the image data stored in the memory, the decoder scans the data along a given row of the image as shown in FIG. 5. The data along the row is passed through an edge detector which determines the locations of the edges in the data. The decoder then searches through the edge data looking for a sequence of eight elements that represent either a start or stop pattern.

The decoder starts at the top of the image data scanning the first row. Then, in subsequent scans of the image data, it moves down a predetermined number of rows and scans that row looking for start or stop patterns. The number of rows between successive scan lines may vary according to the particular environment or the resolution of the image data. For example, where the image data consists of 480 rows by 640 columns of pixel data, the decoder may be set to scan every twentieth row, skipping nineteen rows between successive scan lines.

Figure 6:
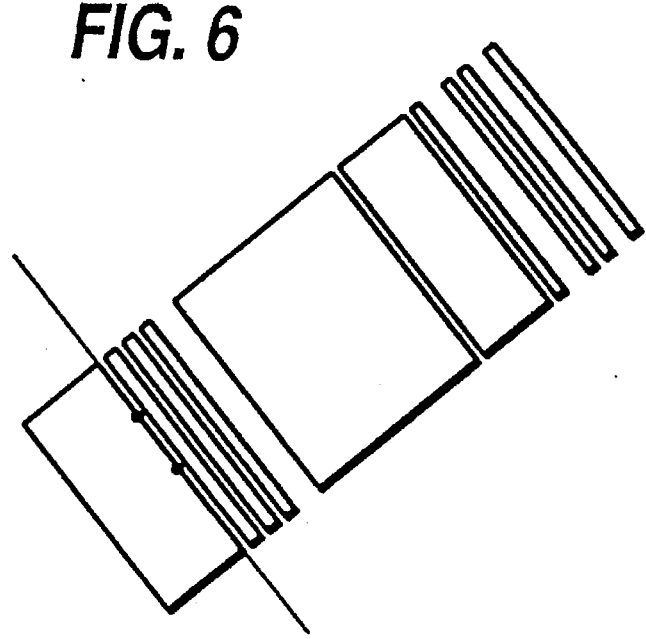
FIG. 6 is a diagram illustrating the determination of the location of the start pattern of the symbol.

If at least two start patterns or two stop patterns are found, then the orientation of the symbol can be determined. For example, as shown in FIG. 5, the two points p1 and p2 represent the locations of two start patterns along the different rows of the image and the two points q1 and q2 represent the locations of two stop patterns along two different rows of the image. A straight line perpendicular to the rows of the symbol can be drawn through the two points as shown in FIG. 6 to determine the orientation of the symbol.

Although theoretically two such points are sufficient to determine a straight line, the decoder will try to accumulate more than two start or stop patterns, up to a predetermined limit. The decoder will then select the two "best" patterns for finding the orientation of the symbol. The best patterns are considered to be those start or stop patterns which have no defects and are as far apart as possible. Alternatively, the decoder can use all detected patterns start patterns and fit a straight line to the points using a least squares fit.

If the decoder is unable to detect two start patterns or two stop patterns while scanning horizontally across the rows, then the decoder will scan the image data vertically down the columns looking for start or stop patterns. If the decoder is still unable to detect at least two start patterns or two stop patterns in either the horizontal or vertical direction, then the camera takes a new picture and the decoding process starts over.

Figure 7:
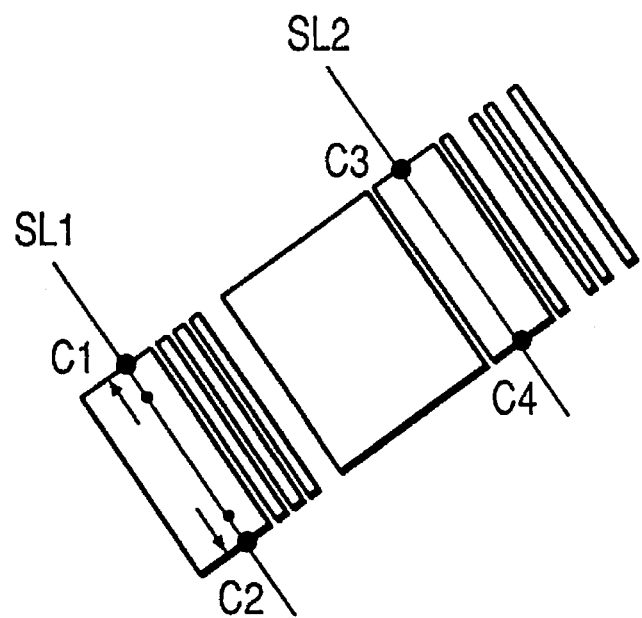
FIG. 7 is a diagram illustrating the determination of the top and bottom of the symbol.

If the decoder is successful in detecting at least two start patterns and two stop patterns in the image data, the decoder then attempts to determine the location of four control points C1, C2, C3, and C4 at the top and bottom of the start and stop patterns as shown in FIG. 7. For the start pattern, this is done by first determining a straight line SL1 through the center of the first bar of the start pattern. Then starting from two points located inside the first bar, the decoder searches outward along the line SL1 for the edges of the symbol. The edges of the symbol are determined by a large change in the gray level of the pixel data along this line. The two edge points found in this way are the control points C1 and C2. A similar procedure is carried out for the stop code word along line SL2 to find the other two control points C3 and C4.

Figure 8A:
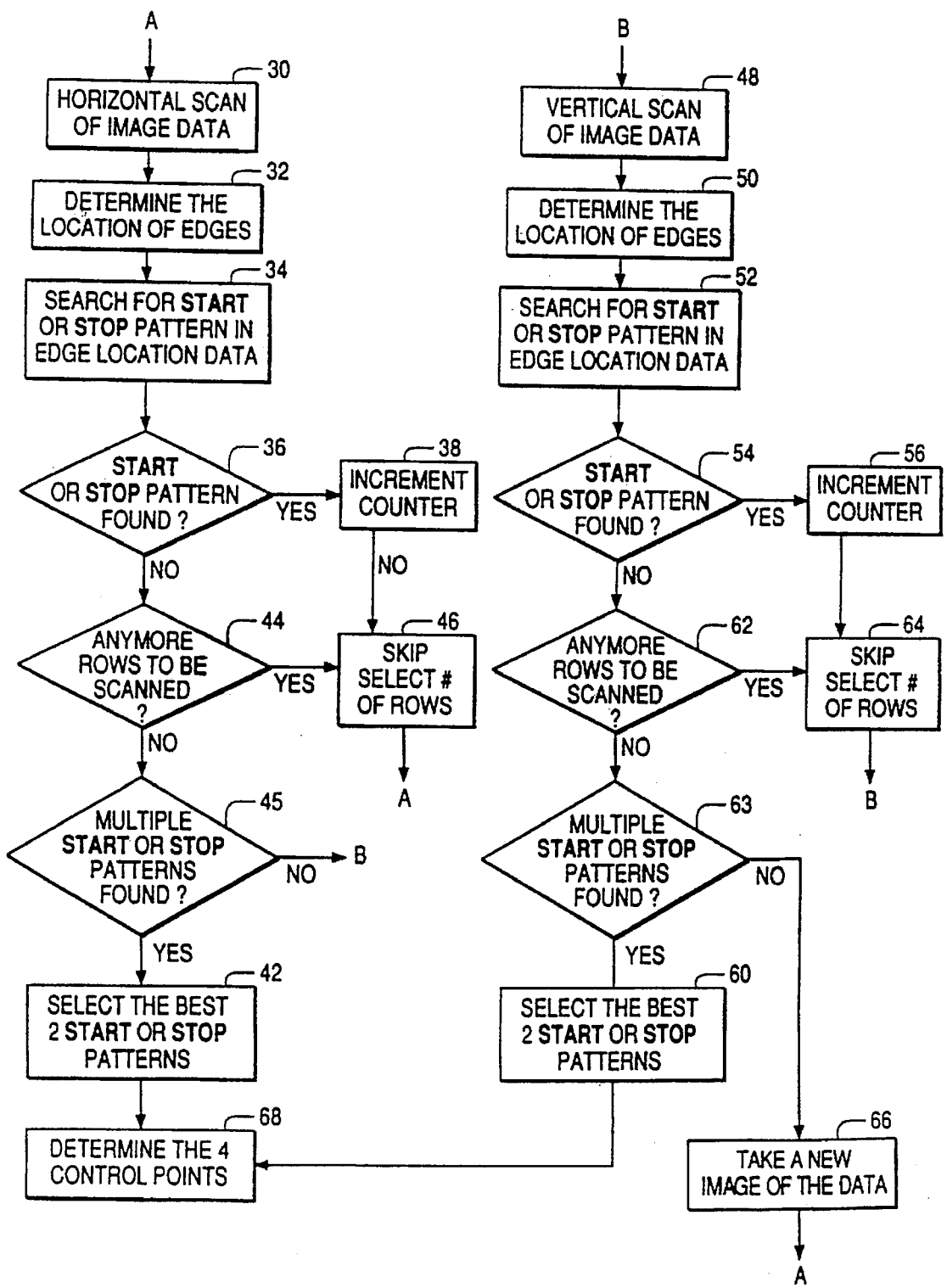
FIG. 8A is a flowchart showing the operation sequence of the decoder for determining the location and orientation of the symbol within the image data.

FIG. 8A is a flowchart showing the sequence of operation of the decoder for determining the location and the orientation of the symbol within the image data. The various steps in the sequence are embodied in a software computer program which is stored in memory 24 and executed by CPU 25 shown in FIG. 4.

As shown in FIG. 8A, determination of symbol location and orientation begins by a horizontal scan of the image data in step 30. Before searching for the start or stop patterns, edge locations of the symbol are determined in step 32.

The edges are determined by traversing a line between two end points and searching for an edge along the line. In particular, the slope of the line is first determined, and starting from the first end point of the line, the value or the gray level of a current pixel on the line is compared with the value of the previous pixel. If the compared value is greater than or equal to a predetermined threshold value, then the edge is at the current pixel position. If the compared value is less than the predetermined threshold value, then the current pixel position is incremented according to the slope of the line and the incremented position becomes the new current pixel position. The current pixel position (the incremented position) is compared with the last pixel position. This procedure is continued until either an edge is found, or the current pixel position reaches the last end point of the line.

Once the edges have been determined, in step 34 a start or a stop pattern is searched for in the edge location data. To find the start pattern, eight successive numbers are read. The first number, however, must be a bar. If it is not, then the next eight successive numbers are read. If the first number is a bar, then the first four numbers are determined. The eight numbers are normalized by divided by the sum of eight values, multiplying by 17 and then rounding to the nearest interest. The result is then compared to the start and stop patterns. If it matches one of those then the pattern is found. If any of the conditions are not met, then the next eight successive numbers are read.

If the start or stop pattern is found in step 36, then the counter is incremented in step 38 and a selected number of rows are skipped, as indicated in step 46. Afterwards, the next horizontal scan of image data is begun.

If a start or stop pattern is not found in step 36, then a determination is made whether there are any additional rows to be scanned. If so, a selected number of rows are skipped in step 46, and the horizontal scan of image data is repeated.

If there are no additional rows to be scanned, then a determination is made of whether multiple stop or start patterns had been found in step 45. If not, a vertical scan of image data is begun in step 48, and in step 50, the location of edges is determined as it was during the horizontal scan. Again, there is a search for start or stop pattern in the edge location data in step 52, similar to the one in step 34 for the horizontal scan, and in step 44, a determination is made whether a start or stop pattern is found. If so, then the counter is incremented in step 56, and a selected number of columns is skipped in step 64. Afterwards, the vertical scan of image data repeats.

If a start or stop pattern was not found in step 54, then a determination is made whether there are any additional columns to be scanned in step 62. If so, a selected rows are skipped in step 64, and the vertical scan of image data continues. If there are no additional columns to be scanned, then a determination is made whether there are multiple start and stop patterns found in step 63. If not, then a new image of the data is taken as indicated in step 66, and a horizontal scan begins at step 30.

If, in steps 45 or 63 there were multiple stop or start commands found, then the two best start or stop patterns are selected in steps 42 or 60, respectively. Based on the two best start and stop patterns selected in either in steps 42 or 60, the four control points are determined in step 68. Alternatively, all the detected start or stop patterns could be used to fit a straight line using a least squares fit. To determine the four control points, a line is drawn passing through the middle of the first bar of both start and stop patterns. A control point lies at a point having a large gray-level change on each line. Therefore, a control point exists along the line at the top and bottom of the first bar of the start pattern and at the top and bottom of the first bar of the stop pattern.

Verifying Symbol Location and Orientation

Once the four control points are determined, the decoder then checks to see that the location and orientation of the symbol form a rectangle. This is done by verifying that adjacent sides of the symbol are at right angles to each other. Two lines are at right angles if their slopes $S_1$ and $S_2$ are related as follows:

$$S_1 = -S_2$$

Figure 8B:
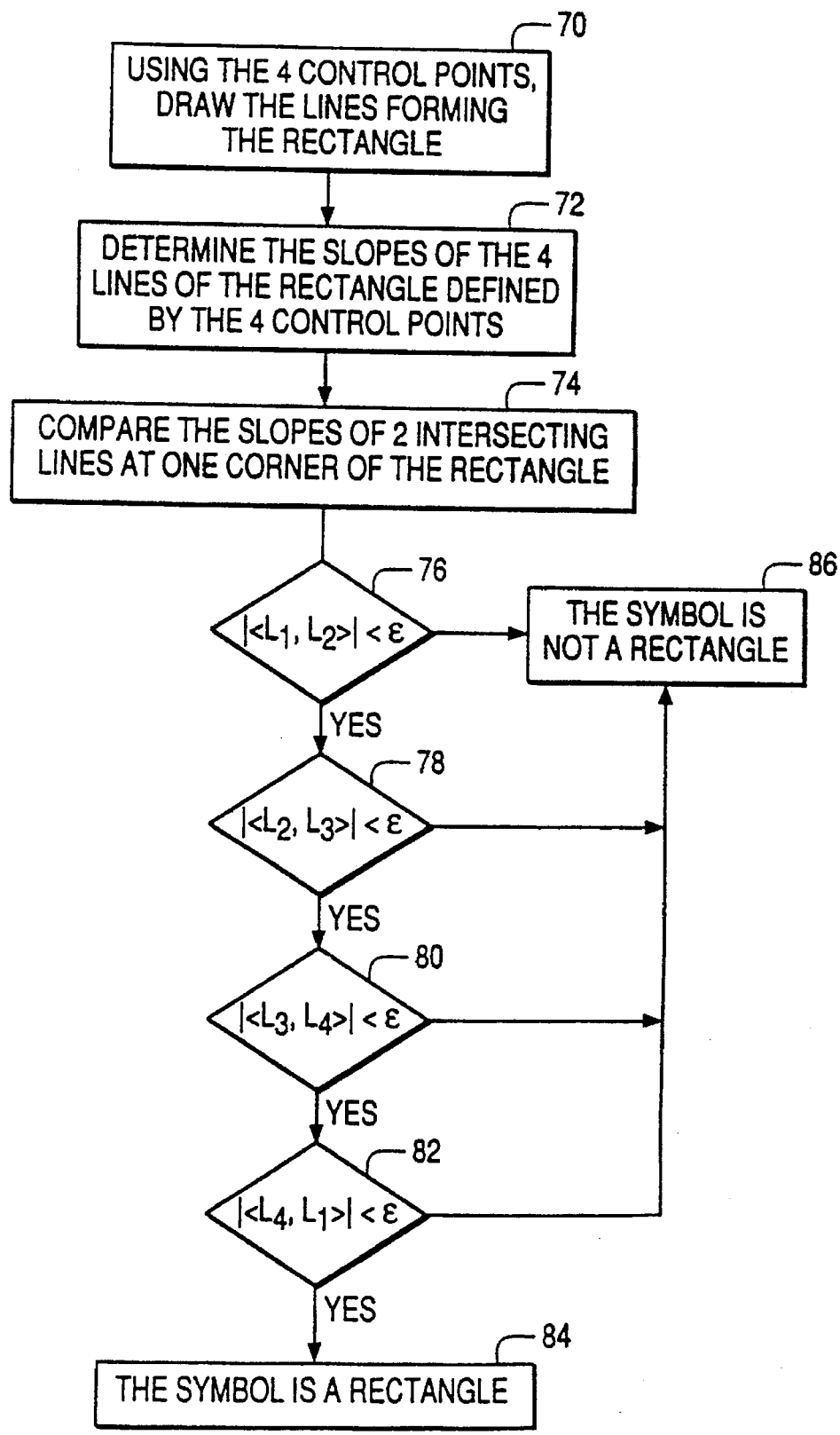
FIG. 8B is a flowchart showing the operation sequence of the decoder for verifying that the four control points actually form a rectangle.

FIG. 8B is a flowchart showing the sequence of operation of the decoder for verifying that the four control points C1, C2, C3, and C4 actually represent a rectangle.

Using for four control points determined in FIG. 8A, a rectangle is formed in step 70 by the lines $L_1$, $L_2$, $L_3$, and $L_4$ connecting those control points. In step 72, the slopes of the intersecting lines are determined by converting them into vectors. Specifically, for lines $L_1$ and $L_2$ that intersection at point $(x_2, y_2)$, the line $L_1$ and line $L_2$ would be defined as follows:

$$L_1: [(x_1, y_1), (x_2, y_2)]$$

$$L_2: [(x_2, y_2), (x_3, y_3)]$$

Lines $L_1$ and $L_2$ are perpendicular if their inner product, or dot product, is zero. The inner product of $L_1$ and $L_2$ is defined as follows:

$$<L_1, L_2> = (x_2-x_1)(x_3-x_2)+(y_2-y_1)(y_3-y_2).$$

In practice, the absolute value of the inner product of lines $L_1$ and $L_2$ is compared to a small positive number e. If the absolute value of the inner product of $L_1$ and $L_2$, $|<L_1, L_2>|$, is less than e, then, as step 76 indicates, lines $L_1$ and $L_2$ are deemed to be perpendicular. If $L_1$ and $L_2$ are perpendicular, then $L_2$ is compared to $L_3$ (step 78), and perhaps $L_3$ is compared to $L_4$ (step 80) and $L_4$ is compared to $L_1$ (step 82). If all the lines are perpendicular, then the conclusion reached in step 84 that the symbol is rectangular. As soon as any two adjacent lines are determined not to be rectangular, the symbol is deemed not rectangular (step 86).

Corner Defect Correction

If the four control points C1, C2, C3, and C4 do not form a rectangle, then it is most likely that one or more of the corners is damaged.

Figure 10:
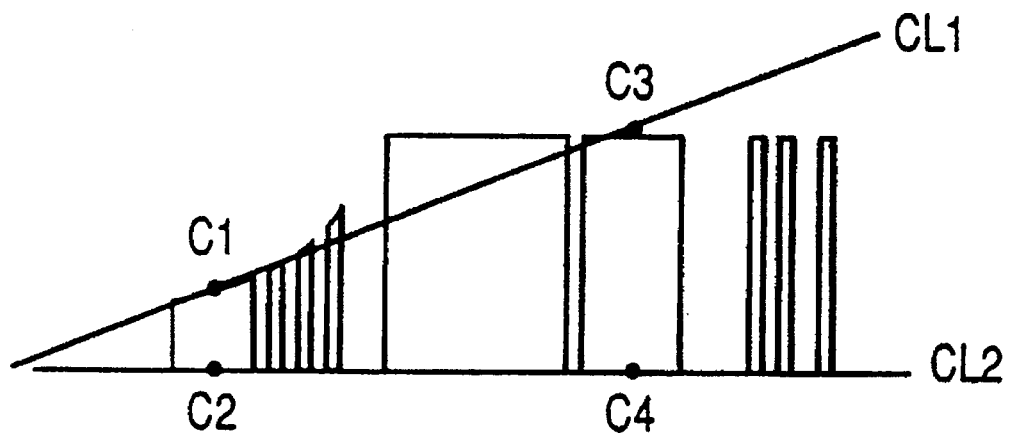
FIG. 10 is a diagram showing a section of symbol with a start pattern damaged by a torn corner.
Figure 11:
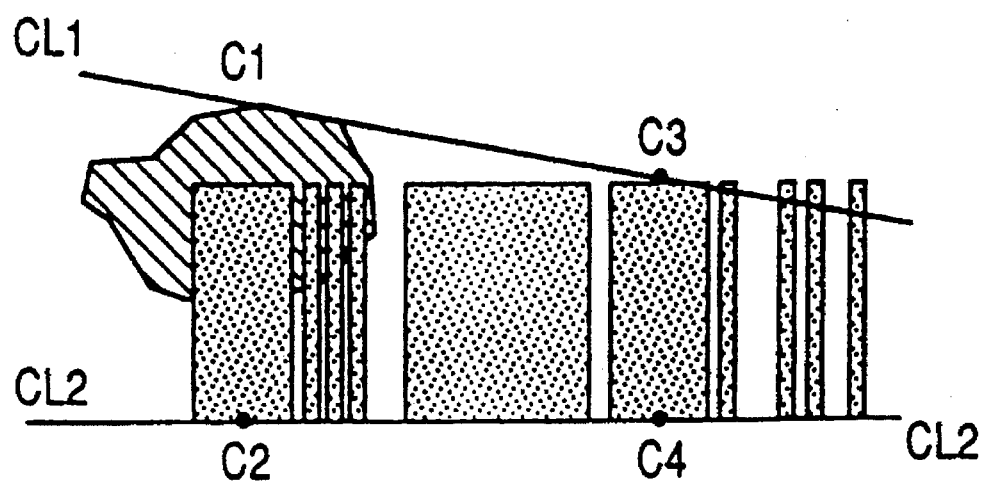
FIG. 11 is a diagram showing a section of a symbol damaged by a stain.

First, the decoder determines two control lines CL1 and CL2 along the top and bottom edges of the symbol as shown in FIG. 10. The decoder then checks to see if each of the control lines CL1 and CL2 have been determined correctly. For example, if one of the corners is torn away (FIG. 10) or obliterated by a stain (FIG. 11), one of the control lines will be incorrect.

Figure 12:
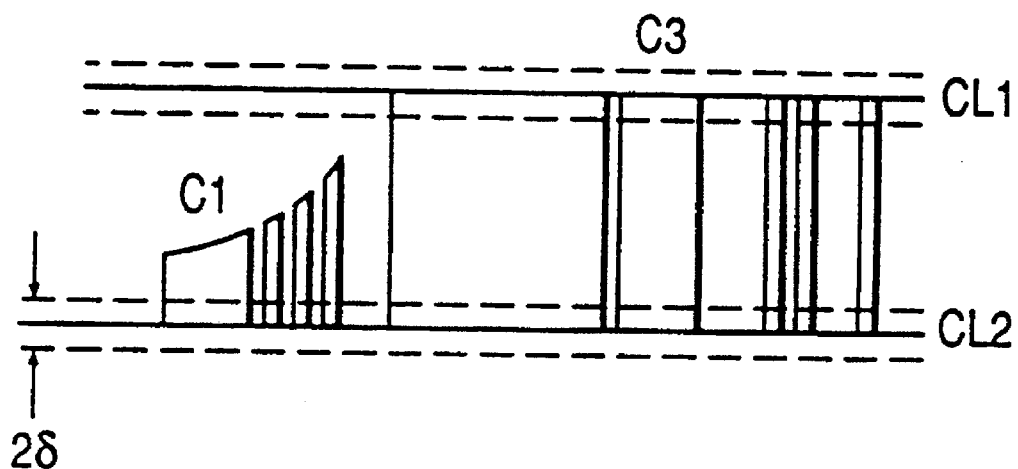
FIG. 12 is a diagram illustrating the determination of neighboring lines for each control line.

In order to determine whether a control line is correct, the decoder will determine, for that control line, two neighboring lines, both parallel to the control line and on opposite sides as shown by the dotted lines in FIG. 12. The neighboring lines are a predetermined distance, such as five pixels, away from the control line. If the control line is correct, then one of the neighboring lines should contain both a start and a stop pattern and the other neighboring line should contain neither.

Once it is determined that one control line is correct, the other control line (e.g., CL1 in FIG. 12) will be corrected so to be parallel to the correct control line (e.g., CL2 in FIG. 2). The new control line can then be verified by determining two neighboring lines as before. If the new control line (CL1) is correct, then one of its neighboring lines must contain either a start or a stop pattern, while the other neighboring line must contain neither.

Figure 13:
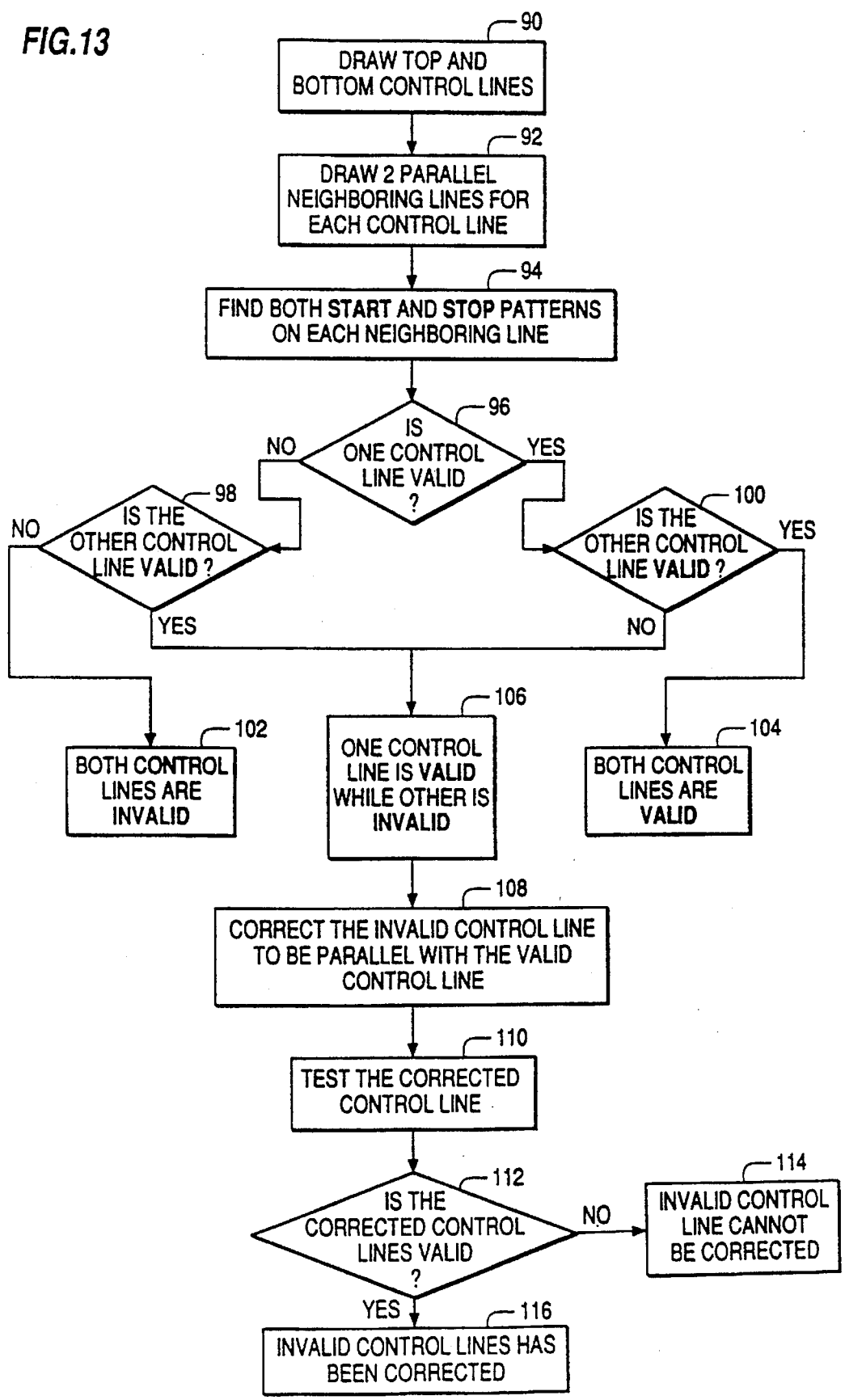
FIG. 13 is a flowchart showing the operation sequence of the decoder for verifying the control lines and correcting for a corner defect.

FIG. 13 is a flowchart showing the sequence of operation of the decoder for verifying the control lines and correcting for a corner defect. In the decoder operation, the damaged corner is adjusted towards a non-damaged corner by this routine which first checks a stop line and then a start line. Although this sequence is arbitrary, it is significant that both lines are tested. If both points on the start or stop lines are damaged, then the routine attempts to adjust the corner point which is relatively lower to the other point by measuring the length of the lines $C_1$, $C_2$ (see FIG. 10) and $C_3$ $C_3$ and $C_3$ $C_4$. In the routine, line $C_3$ $C_4$ is longer than $C_1$ $C_2$, so $C_1$ is adjusted to be the height of $C_3$.

In step 90, top and bottom control lines are drawn, and in step 92 two parallel neighboring lines are drawn for each control line. In the manner described above, the start and stop patterns are found, if possible, on each neighboring line in step 94. This is to see whether the control lines are valid in the manner described above.

If in step 96 one of the control lines is determined to be valid, then in step 98, a question is asked whether the other control line is valid. If not, then in step 102 a determination is made that both control lines are invalid.

If in step 96 one of the control lines is valid, and in step 100 the other control line is determined to be valid, then the conclusion is reached in step 104 that both control lines are valid.

If, as a result of the determinations in steps 98 and 100, only one of the control lines is determined to be valid, this is noted in step 106, and in step 108, the invalid control line is corrected to become parallel with the valid control line, as described above.

Next, the corrected control line is tested in step 110. If the corrected control lines are both valid in step 112, then in step 116, determination can be made that the invalid control line has been corrected. Otherwise, in step 114, a determination is made that the invalid control line cannot be corrected.

Virtual Scanning

Once the four control points that define the location and orientation of the label have been determined, the decoder performs "virtual scanning" of the image data stored in the memory. This involves selecting a sequence of pixels from the image data that cross the symbol from the start pattern to the stop pattern parallel to a line defining the top of the symbol. Thus, the data obtained in this way will represent a scan along a row of the symbol.

This sequence of pixel data is sent through an edge detector to determine the locations of the transitions from dark to light or light to dark in the symbol. The transitions are then used to determine the width of the bars and spaces in the symbol. The sequence of data corresponding to the width of the bars and spaces in symbols is in the same format as data obtained from a laser scanner.

Figure 9:
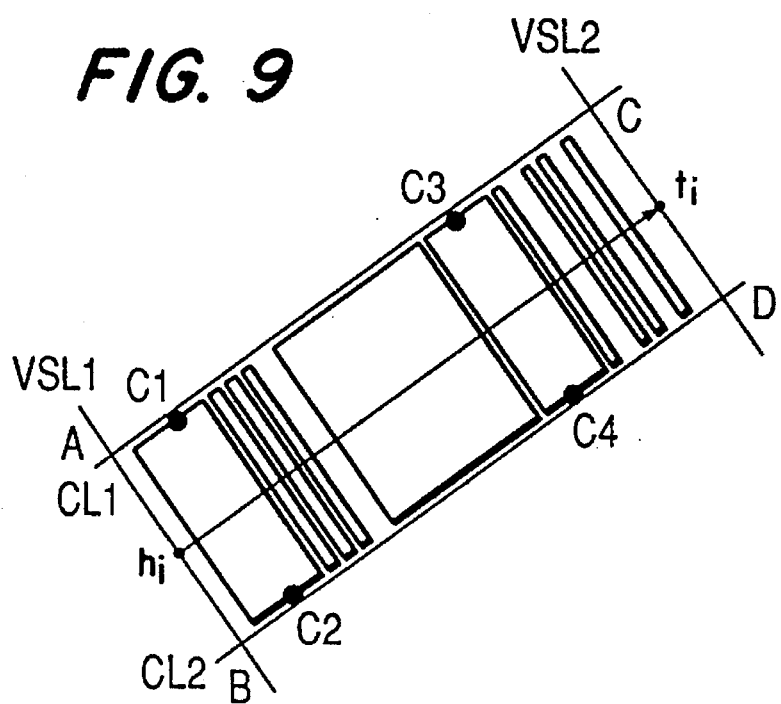
FIG. 9 is a diagram illustrating the determination of the four corners of the symbol and the scanning control lines as well as virtual scan lines.

More specifically, once the four control points C1, C2, C3, and C4 are determined, the decoder determines the location of control lines CL1 and CL2 as shown in FIG. 9. Then, a virtual scan start line VSL1 and a rescan stop line VSL2 are determined. Line VSL1 is parallel to the start pattern and passes through the quiet zone adjacent the start pattern. Likewise, line VSL2 is parallel to the stop pattern and passes through the quiet zone adjacent the stop pattern.

In order to scan a row of the symbol in the image data, the decoder identifies both the head point on the scan start line VSL1 and the corresponding tail point on the scan stop line VSL2. The scan head and tail points may be all the points on the line segments of RSL1 and RSL2 between the control lines CL1 and CL2. Alternatively, as explained in further detail below, the number of scan lines may be minimized by using a rescan optimization strategy. Point positions for the rescan head and tail points are stored in an array for rescanning the image data.

For each scan "head-tail" point pair, the decoder scans along a line from the scan head point to the scan tail point. A typical scan line is shown in FIG. 9 scanning from scan head point $h_i$ to scan tail point $t_i$. The decoder fetches the gray-level values along the line from the image data. This line of data is then processed to obtain the required output data format.

One way to obtain the output data from the gray-level values is to use edge detection. Using this method, the decoder first calculates the difference between successive gray-level values along the rescan line. The decoder then looks for extrema within a specified neighborhood, such as a window of three pixels, in the sequence of difference values. Edges are determined to be where the magnitude of an extremum of the difference values exceeds a predetermined threshold. The widths of the bars and spaces are then computed by determining the distance between the edges.

Alternatively, if the number of codewords in each row are known or have been determined from decoding part of the symbol, the width of the bars and spaces can be determined by applying a binary decision on the gray-level values of the rescan line. In this procedure, only those gray-level values on a rescan line that passes through the middle of a row are used to make a binary decision.

First, the decoder determines the beginning point B of the first codeword and the end point E of the last codeword, excluding the start and stop patterns. The whole interval (B, E) is then divided into unit intervals $I_k$. Specifically, the number of pixels in the line is divided by the total number of modules in the row, which is equivalent to the number of codewords times the number of modules per codeword, in order to obtain the average module length u. Typically, the average module length u will not be an integer, so it becomes necessary to assign an approximated module length for each module in the row of codewords.

If the module length u is not an integer, it will necessarily fall between two integers. Therefore, for each module length there exists an integer k such that $$k<u<k+1$$

Therefore, there are two ways to assign an approximated module length value for each module, namely picking one of either k or k+1. If k is picked, then this results in an approximation error of $$e_k=u-k$$

If k+1 is picked, this results in an approximation error of $$e_k=-(k+1-u)$$

The selected integer value, either k or k+1, is therefore the one that minimizes the accumulated approximation error, where the accumulated approximation error up to the kth module is given by:

$$\text{Accumulated error} = \sum_{i=0}^{k} e_i$$

Once the width of each module is determined, the decoder can decide whether each module is either black or white by applying a binary decision to the gray-level values of the module. Specifically, the gray-level values in each module are summed up and compared with a predetermined threshold to make the decision whether the module is black or white.

As discussed above, the decoder may scan every possible rescan line between lines CL1 and CL2. Although this strategy results in the maximum amount of information for decoding the symbol, there is a significant amount of overhead because one rescan line is sufficient for each row if the line is determined correctly.

Therefore, the number and location of the scan lines may be optimized based on the following considerations:

(1) Two adjacent rescan lines inside the same row of the symbol (SL1 and SL2 in FIG. 14) should have the same gray-level profiles, except for a small amount of deviation due to noise;

(2) Two adjacent rescan lines from different rows of the symbol (SL2 and SL3 in FIG. 14) should have a larger "distance" between their gray-level profiles; and (3) The distance measure D(S1,S2) between two rescan lines S1 and S2 is defined as the sum of all distances between corresponding pixels on the lines, where the distance d(S1[i],S2[i]) between respective pixels S1[i] and S2[i] is determined as follows:

$$d(S1[i],S2[i]) = \begin{cases} 0 & \text{if } |S1[i]-S2[i]| < T \\ 1 & \text{if } |S1[i]-S2[i]| > T \end{cases},$$

where T is a predetermined threshold. Therefore, the gray-level distance between two rescan lines S1 and S2 is determined as follows:

$$D(S1,S2) = \Sigma \, d(S1[i],S2[i])$$

Accordingly, D(S1,S2) will be small when two adjacent rescan lines are near the middle of a row and will be large when two adjacent rescan lines are crossing the boundary between adjacent rows.

Figure 14:
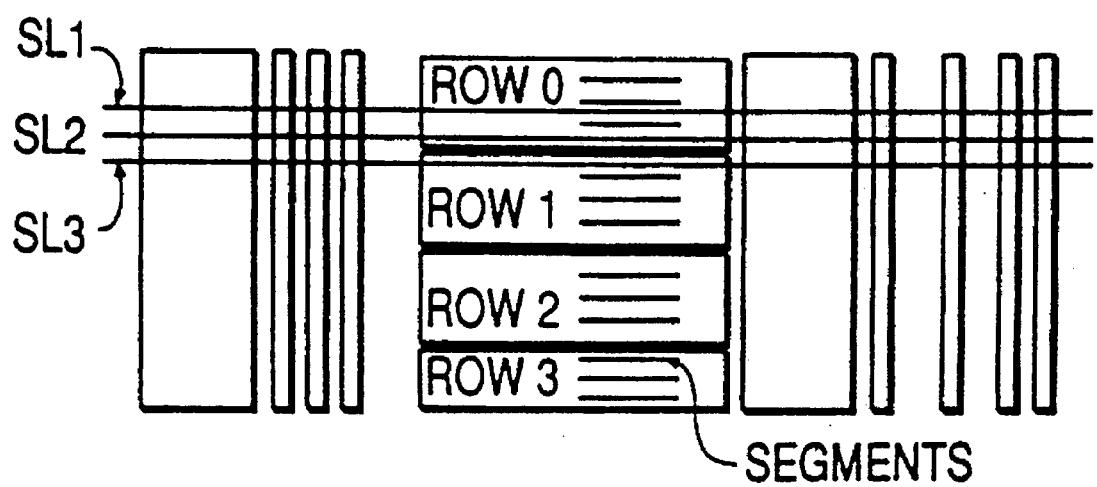
FIG. 14 is a diagram illustrating the determination of label width estimation and virtual scan path optimization.

In order to optimize the scan paths, the decoder first computes the distance between successive segments of all possible rescan lines. The length of the line segments should be long enough to cover at least one codeword as shown in FIG. 14. Using segments instead of whole rescan lines greatly reduces the computation time. When all of the distances have been computed, the rescan lines can be laid where the distance is a local minimum, corresponding to the middle of row of the symbol.

Figure 15A:
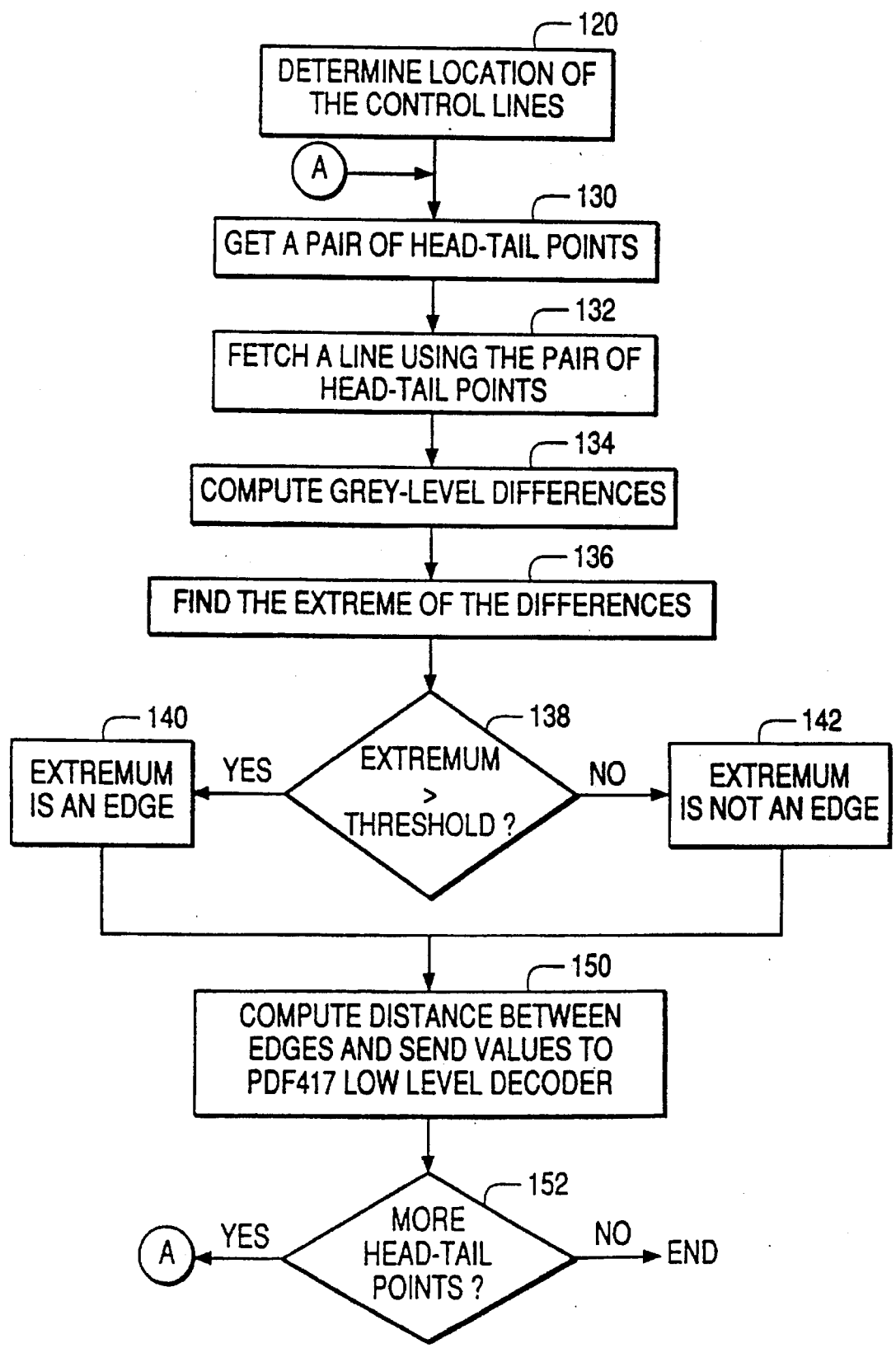
FIGS. 15A and 15B are a flowchart showing operation sequence of the decoder for performing virtual scanning of the image data.
Figure 15B:
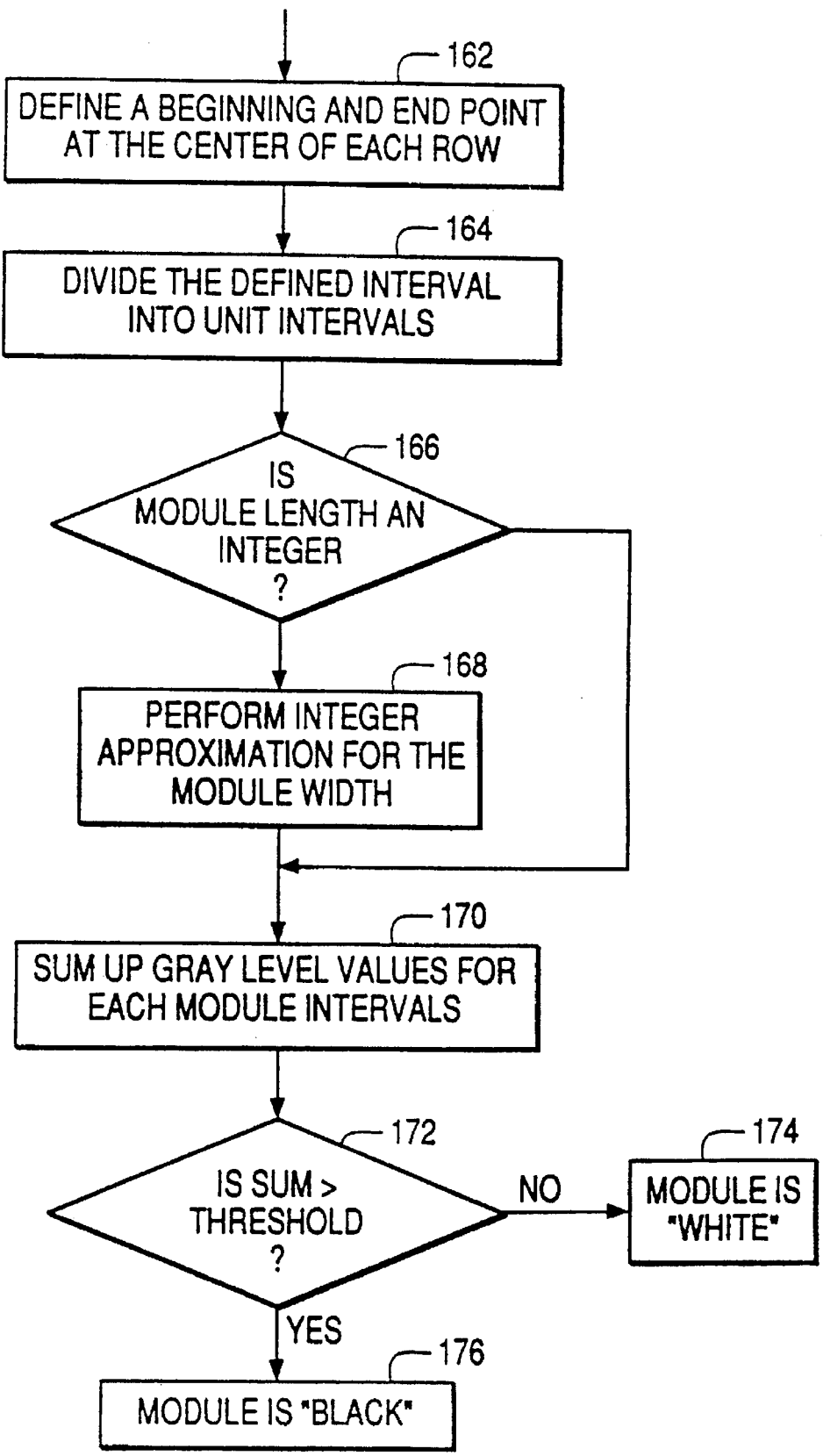

FIGS. 15A and 15B are flowcharts showing the sequence of operation of the decoder for performing virtual scanning of the image data.

FIG. 15A is a flow chart illustrating the edge detection method of outputting the image data. As shown in FIG. 15A, once the location of control lines have been determined (step 120), a pair of head-tail points is retrieved in step 130. In step 132, a rescan line is drawn by connecting the pair of head-tail points. The differences between the gray levels are computed along the rescan line in step 134.

In step 136, extrema of the difference values are determined within a specified neighborhood (usually a window of 3 pixels). The extrema are determined by locating and recording the maximum and minimum values within a neighborhood or window of a specified point. If the magnitude of the located maximum or minimum value is large enough and the position is not at the boundary of the neighborhood, then that position is considered as an extremum.

In step 138, each extremum is compared with a predetermined threshold value to determine whether the extremum is an edge. If the extremum is greater than the threshold, then in step 140 that extremum is indicated as an edge. Otherwise, in step 142 the extremum is indicated as not being an edge. In step 150, distances between the determined edges (output sequence) are computed and sent to the low level decoder. The above steps are repeated until no more head-tail points remain (step 152).

FIG. 15B is a flow chart illustrating a center sampling and binary decision method of outputting the image data. This method uses the data on the start and stop patterns, control points, label row width, and width of modules.

In step 162 of FIG. 15B, a beginning point B of the first non-start/stop codeword and an end point E of the last non-start/stop codeword are defined. In step 164, the interval between the two points B–E are divided into predetermined unit intervals. If the module width is a non-integer number, then an integer approximation routine is performed for the module width in step 168. The errors associated with the approximation were explained previously.

Once the interval B–E have been divided, the gray-level value for each module interval is summed up in step 170 and compared with a predetermined threshold number in step 172. If the sum is greater than the threshold number, then the module is considered to be "black." If not, the module is considered to be "white." Therefore, according to the sequences of black and white modules, the output of image data is produced.

The data obtained by rescanning the image data is output to a low-level decoder for further decoding the data. A low-level decoder for decoding a two-dimensional symbol such as PDF417 is described in U.S. patent application Ser. No. 07/851,505, entitled "A System for Encoding and Decoding Data In Machine Readable Graphic Form," filed Mar. 16, 1992 and assigned to the same assignee as the present invention, which is hereby incorporated by reference.

Damaged Symbols

In addition to the corner defects described above, the bar code symbols may be damaged in other ways. For example, one of the start or stop patterns may be damaged. If the other pattern can still be identified, however, then the decoder will determine only two of the four control points C1, C2, C3, and C4. In the example shown in FIG. 16, where the start pattern of the symbol is destroyed, the decoder will determine only control points C2 and C4.

Figure 16:
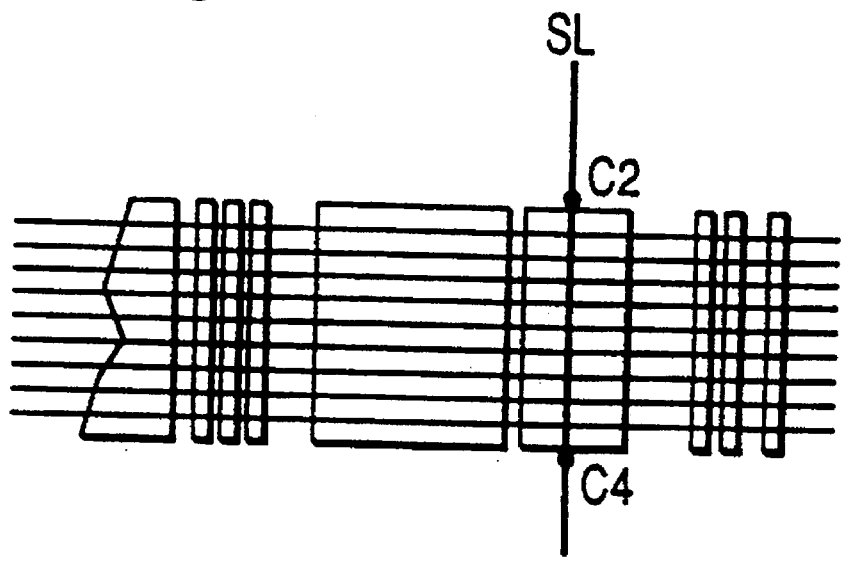
FIG. 16 is a diagram illustrating the determination of virtual scan lines when one of the start or stop patterns is damaged.

From these two control points, the decoder will then determine a single line SL as shown in FIG. 16. Once SL is obtained, a set of rescan lines can be determined between the two control points, each one perpendicular to the line SL.

This procedure necessarily assumes, however, that the frame grabber causes no geometric distortion (i.e., essentially square pixels). If the rectangular shape of the symbol is distorted into a parallelogram, then this procedure will not work.

Figure 17:
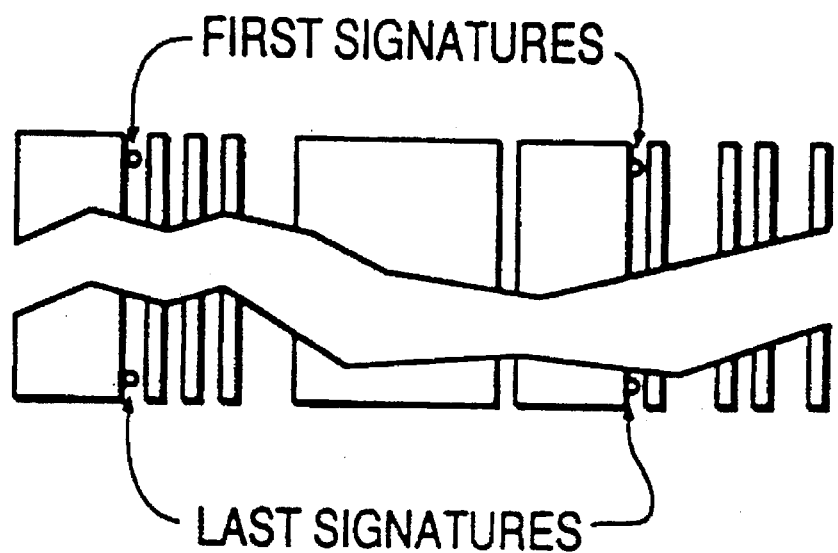
FIG. 17 is a diagram showing the decoding of a symbol having a scratch in the middle.

The decoder may also decode symbols that have a scratch in the middle such as shown in FIG. 17. Since the decoder begins searching for the two control points from the farthest valid start or stop patterns, a scratch in the middle should not affect the locating of control points. However, each of the remaining corners must be read by at least one scan line while trying to determine the location and orientation of the symbol.

It will be apparent to those skilled in the art that various modifications and variations can be made in the decoding method and apparatus without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for reading and decoding a two-dimensional bar code symbol having rows of bar-coded information in which data is represented in each row by a plurality of codewords, each row including a predetermined control codeword, the codewords being formed of a plurality of modules, comprising:

a two-dimensional imaging camera for optically imaging the bar code symbol to obtain lines of image data corresponding to a field of view including the bar code symbol;

a memory for storing the lines of image data;

means for determining an orientation of the two-dimensional bar code symbol in the field of view by locating control codewords in at least two positions in the image data;

means for determining a sequence of lines passing through the rows of the bar code symbol in the image data from the orientation determined from the positions of the control codewords; and means for scanning the two-dimensional bar code symbol in the image data along the sequence of lines line to read the codewords.

2. The system according to claim 1, wherein each row of the symbol includes two predetermined control codewords, one control codeword being a start codeword at the beginning of each row and the other control codeword being a stop control codeword at the end of each row.

3. The system according to claim 1, further comprising means for detecting defects in the two-dimensional bar code symbol and correcting the detected defects in the two-dimensional bar code symbol.

4. The system according to claim 1, further comprising a host computer for decoding the codewords obtained by scanning the two-dimensional bar code symbol in the image data.

5. The system according to claim 1, further comprising a frame grabber for converting analog signals from the camera into digital signals.

6. The system according to claim 1, wherein the bar code symbol contains a plurality of modes in which data is stored.

7. A method for reading and decoding a two-dimensional bar code symbol having rows of bar-coded information in which data is represented in each row by a plurality of codewords, each row including a predetermined control codeword which is the same for each row, the codewords being formed of a plurality of modules, the method comprising the steps of:

optically imaging the two-dimensional bar code symbol using a two-dimensional imaging camera to obtain lines of image data corresponding to a field of view including the bar code symbol;

storing the lines of image data in a memory;

determining an orientation of the two-dimensional bar code symbol in the field of view by locating control codewords in at least two positions in the image data;

determining a sequence of lines passing through the rows of the bar code symbol in the image data from the orientation derived from the positions of the control codewords; and scanning the two-dimensional bar code symbol in the image data along the sequence of lines to read the codewords.

8. The method according to claim 7, wherein each row of the symbol includes two predetermined control codewords, one control codeword being a start codeword at the beginning of each row and the other control codeword being a stop control codeword at the end of each row.

9. The method according to claim 7, further comprising the steps of detecting defects in the two-dimensional bar code symbol; and scanning the two-dimensional bar code symbol despite the presence of defects.

10. The method according to claim 7, further comprising the step of decoding in a host computer the codewords obtained by scanning the two-dimensional bar code symbol in the image data.

11. The method according to claim 7, further comprising the step of converting analog signals from the camera into digital signals using a frame grabber.

12. The method according to claim 7, wherein the bar code symbol contains a plurality of modes in which data is stored.

* * * * *

UNITED STATES PATENT AND TRADEMARK OFFICE
CERTIFICATE OF CORRECTION

PATENT NO.: 5,635,697

DATED: June 3, 1997

INVENTOR(S): Shellhammer et al.

It is certified that an error appears in the above-identified patent and that said Letters Patent is hereby corrected as shown below:

<u>IN THE ABSTRACT</u>:

Line 9, after "code", please add the following --symbol in the image data is determined and verified. Defects and damages on the symbol are detected and corrected. The symbol is scanned to read the codewords of the two-dimensional bar code symbol.--

Signed and Sealed this

Tenth Day of November 1998

*Attest:*

BRUCE LEHMAN

*Attesting Officer*         *Commissioner of Patents and Trademarks*